C. H. PARKER.
DRAFT POLE.
APPLICATION FILED APR. 5, 1913.
1,100,609.  Patented June 16, 1914.
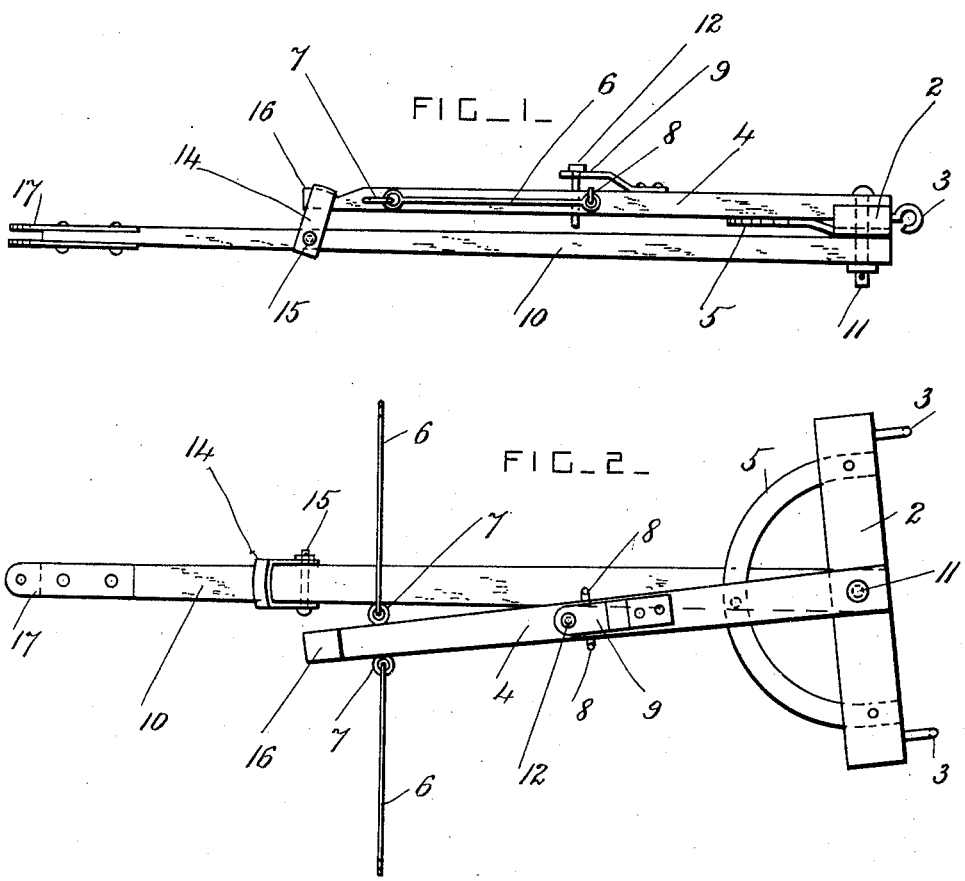

UNITED STATES PATENT OFFICE.

CLARK H. PARKER, OF BEAVER DAM, WISCONSIN.

DRAFT-POLE.

1,100,609.

Specification of Letters Patent.

Patented June 16, 1914.

Application filed April 5, 1913. Serial No. 759,070.

*To all whom it may concern:*

Be it known that I, CLARK H. PARKER, a citizen of the United States, residing at Beaver Dam, in the county of Dodge and State of Wisconsin, have invented certain new and useful Improvements in Draft-Poles; and I do hereby declare the following to be a full, clear, and exact description of the invention, such as will enable others skilled in the art to which it appertains to make and use the same.

This invention relates to draft poles for all kinds of heavy vehicles or agricultural implements, such as threshing machines, which are hauled upon roads and which have to be moved back and forth into certain preferred positions for work; and it consists in providing the main pole with an auxiliary pole which is normally clamped to the main pole as hereinafter fully described and claimed.

In the drawings, Figure 1 is a side view of a main pole and an auxiliary pole constructed according to this invention, and showing them coupled together. Fig. 2 is a plan view of the poles, showing them unclamped and moved out of their normal position.

A crossbar 2 is provided and this crossbar may be the front axle of the vehicle or other wheeled machine. When this crossbar is formed separate from the front axle it is provided with rearwardly projecting eyes 3, or other similar fastening devices, for operatively connecting it with the front axle of the machine. The main pole 4 is rigidly secured to the crossbar 2, and 5 are stays arranged between the crossbar and the rear end portion of the main pole. Rods 6, are attached to the front end portion of the main pole. These rods 6 are pivoted to eyes 7 which project from the sides of the pole. The rods are folded parallel with the pole when not in use, and 8 are hooks which project from the middle part of the pole, and which sustain the rods 6 when not in use. A single foldable steering rod 6 can be used if desired.

An auxiliary pole 10 is pivoted to the main pole and its crossbar by a pin 11, and is free to move pivotally in a horizontal plane. The two poles are normally arranged parallel to each other with the main pole uppermost, and a loop or bail 14 is pivoted to the auxiliary pole 10 by a pin 15 and engages with the front end portion of the main pole so as to clamp the two poles together. The main pole has an inclined portion 16 on its upper side for the loop 14 to engage with, and the elasticity of the poles permits the loop to be sprung into engagement with the inclined portion 16 so that the loop is locked automatically. The loop 14 also supports the auxiliary pole 10 from the main pole, so that guides and other supports are not required. A bracket 9 is secured to the middle part of the main pole, and is provided with a pivot pin 12 for the attachment of a whiffletree or other draft connection. The front end portion of the auxiliary pole projects beyond the front end of the main pole, and it is provided with a draft connection 17, such as a pair of links or an eye, for the attachment of the motor or team.

The machine is usually hauled along the roads by some approved form of traction engine which is coupled to the draft connection 17, and the two poles are clamped together while the machine is being moved from place to place. When the machine arrives at its destination and requires to be placed in a barn, or in some preferred position, the main pole is unclamped and is operated pivotally by hand and by means of the rods 6, so as to turn the crossbar or the front axle of the machine, and enable the machine to be shifted back and forth and at various angles with facility.

What I claim is:

1. The combination, with a main draft pole having a crossbar and connections at its rear end for coupling it to a vehicle, of an auxiliary pole pivoted to the rear part of the main pole and projecting beyond its front end and provided with a draft attachment, a disengageable locking device for holding the two poles in line with each other, and a handle rod pivoted to the front end portion of the main pole, and a catch projecting from the main pole and engaging with the handle rod when folded back against the main pole.

2. The combination, with a main draft and steering pole provided with means for connecting it to a vehicle, of an auxiliary draft pole pivoted to the main pole, a locking loop pivoted to one pole and engaging with the other pole and held in its locked position by the elasticity of the poles, a foldable steering rod pivoted to the main pole, and a catch which projects from the main pole and normally supports the free end portion of the steering rod.

In testimony whereof I have affixed my signature in the presence of two witnesses.

CLARK H. PARKER.

Witnesses:
J. C. HARLEY,
GEORGE MAGUIRE.

Copies of this patent may be obtained for five cents each, by addressing the "Commissioner of Patents, Washington, D. C."